(12) United States Patent
Alves

(10) Patent No.: US 10,561,278 B2
(45) Date of Patent: Feb. 18, 2020

(54) FOOD PROCESSING SYSTEM PRESENTING AN INTEGRATED WEIGHING ARRANGEMENT

(71) Applicant: FLAMA, FÁBRICA DE LOUÇAS E ELECTRODOMÉSTICOS, SA, Cesar (PT)

(72) Inventor: Luis Alves, Cesar (PT)

(73) Assignee: FLAMA, FÁBRICA DE LOUÇAS E ELECTRODOMÉSTICOS, SA, Cesar (PT)

( * ) Notice: Subject to any disclaimer, the term of this patent is extended or adjusted under 35 U.S.C. 154(b) by 15 days.

(21) Appl. No.: 15/859,902

(22) Filed: Jan. 2, 2018

(65) Prior Publication Data

US 2018/0116465 A1    May 3, 2018

Related U.S. Application Data

(63) Continuation of application No. PCT/PT2016/000007, filed on Jun. 23, 2016.

(30) Foreign Application Priority Data

Jul. 2, 2015  (PT) .......................... 108656

(51) Int. Cl.
   *A47J 43/07*   (2006.01)
   *G01G 19/52*   (2006.01)
   *G01G 19/56*   (2006.01)

(52) U.S. Cl.
   CPC .......... *A47J 43/0716* (2013.01); *G01G 19/52* (2013.01); *G01G 19/56* (2013.01); *A47J 2043/0733* (2013.01)

(58) Field of Classification Search
   CPC .......... A47J 2043/0733; A47J 43/0716; G01G 19/52; G01G 19/56; G01G 19/22
   See application file for complete search history.

(56) References Cited

U.S. PATENT DOCUMENTS

| 4,432,247 A | | 2/1984 | Takeno et al. | |
|---|---|---|---|---|
| 4,726,435 A | * | 2/1988 | Kitagawa | G01G 23/06 177/154 |
| 5,174,403 A | * | 12/1992 | Geiger | A47J 27/14 177/245 |
| 5,329,069 A | * | 7/1994 | Amsel | A47J 43/046 177/132 |

(Continued)

FOREIGN PATENT DOCUMENTS

| DE | 1 894 430 U | 6/1964 |
|---|---|---|
| DE | 31 48 585 A1 | 6/1983 |

(Continued)

*Primary Examiner* — Tony G Soohoo
(74) *Attorney, Agent, or Firm* — Keating & Bennett, LLP

(57) ABSTRACT

The present invention refers to a food processing system presenting a recipient adapted for receiving food ingredients, and a driving arrangement adapted for driving a tool support provided inside of the recipient, and at least one weighing arrangement adapted for weighing the food ingredients. In particular, the weighing arrangement has an elongated structural member and at least one weighing member provided as a single piece that can be directly attached to the recipient or to the driving arrangement thereof.

15 Claims, 4 Drawing Sheets

(56) References Cited

U.S. PATENT DOCUMENTS

| | | | | |
|---|---|---|---|---|
| 5,799,567 A * | 9/1998 | Dorner | | A47J 27/14 |
| | | | | 99/348 |
| 6,194,013 B1 * | 2/2001 | Kolar | | A23G 9/045 |
| | | | | 222/77 |
| 6,342,260 B2 * | 1/2002 | Kolar | | A23G 9/045 |
| | | | | 222/77 |
| 9,161,662 B2 * | 10/2015 | Sladecek | | A47J 27/004 |
| 2015/0305564 A1 * | 10/2015 | Jimenez | | A47J 43/046 |
| | | | | 366/141 |
| 2018/0110354 A1 * | 4/2018 | Chou | | A47J 27/004 |
| 2019/0001288 A1 * | 1/2019 | Ciepiel | | B01F 13/1063 |

FOREIGN PATENT DOCUMENTS

| | | |
|---|---|---|
| DE | 33 08 780 A1 | 9/1984 |
| DE | 89 05 567 U1 | 8/1989 |
| EP | 0 396 059 A1 | 11/1990 |
| EP | 0 561 259 A1 | 9/1993 |
| EP | 0 757 532 B1 | 6/1998 |
| EP | 1 123 678 B1 | 10/2003 |
| EP | 1 647 217 A1 | 4/2006 |
| EP | 1 981 383 B1 | 3/2011 |
| WO | 2012/030826 A1 | 3/2012 |

* cited by examiner

FOOD PROCESSING SYSTEM PRESENTING AN INTEGRATED WEIGHING ARRANGEMENT

CROSS-REFERENCE TO RELATED APPLICATIONS

This application is a continuation of copending International Application No. PCT/PT2016/000007, filed Jun. 23, 2016, which is incorporated herein by reference in its entirety, and additionally claims priority from Portuguese Application No. 108656, filed Jul. 2, 2015, which is also incorporated herein by reference in its entirety.

BACKGROUND OF THE INVENTION

The present invention refers to the field of food processing systems or cooking systems presenting a recipient for food ingredients and a weighing arrangement adapted for weighing food ingredients provided to said recipient.

The integration of a weighing device into a cooking apparatus presents several technical issues. Besides of construction simplicity it is entailed that said weighing devices can quickly measure relatively small weights, as for example when adding very small amounts of seasoning ingredients, quickly sense variations thereof, such as for example when pouring a granular ingredient to a previous cooking mixture, and display these to users.

The conventional technology includes several solutions relating to cooking systems presenting a recipient adapted for receiving food ingredients and a scale arrangement provided for weighing said food ingredients.

Document DE 1894430 discloses a cooking machine with a weighing device for weighing of food ingredients in a respective recipient, whereby said weighing device is provided such that a respective load displaceable element forms a non centered supporting point of said cooking machine.

Document DE 3148585 A1 discloses a cooking machine that presents a weighing device provided inside the machine casing and comprising a display element and whereby the cooking recipient is disposed upon a vertically displaceable support means of the weighing device.

Documents DE 3308780 A1 and DE 8905567 U1 propose cooking machines presenting weighing members provided in a supporting member of said cooking machine.

Document EP 0396059 B1 discloses a cooking machine of the aforementioned field of the invention, whereby weight sensors are associated with leaf spring mountings.

Document EP 0561259 B1 discloses another cooking machine comprising a recipient and a weighing device incorporating a force-detecting element which is connected to the appliance base in which at least one bearing element can slide vertically against the force of a biased spring is provided between the force-detecting element and the recipient, whereby said recipient is adapted to be latched to the appliance base and whereby said latching has to overcome the force bias of a spring and is maintained by a clamping device.

Document EP 0757532 B1 proposes a kitchen machine comprising a weighing device disposed such that it holds the weight of a recipient and of a respective heating device Document EP 1123678 B1 discloses a food processor that stands on an underlying surface via spaced apart bearing feet and presenting a weighing device integrated in each of said bearing feet. This arrangement presents several constrains in terms of weight measuring precision, in particular in the case of relatively small weights, as it is often the case in cooking recipes, and rapid weight measuring responsiveness.

Document EP 1981383 B1 discloses a food processor presenting a casing containing an electric motor and an associated drive system, wherein said casing comprises a pair of transverse rails, each of which mounted directly to a pair of standing feet and having at least one load cell mounted directly thereupon. Each load cell is associated with a respective load cell frame upon the upper surfaces of which the food processor is supported. Moreover, each load cell is mounted directly to the underside of a respective load cell frame and is mounted to the upper surface of a respective rail by means including a respective load cell stand of relatively small area. This arrangement presents certain constrains in terms of construction simplicity, using many individual small pieces, and weight measuring precision, in particular in the case of relatively small weights.

None of the aforementioned documents provides a solution for an integrated weighing arrangement of simple construction, whereby the load variations above are transmitted along direct structural arrangements, with no intermediate structural means, to substantially elongated weighing arrangements and respectively elongated weighing devices.

The objective of the present invention is to provide a food processing system comprising a recipient for collecting food ingredients, means for processing said food ingredients and a weighing arrangement that presents a simple construction, improves measuring precision, in particular for smaller weight values, and reduces measuring delays, in particular while ingredients are being added to said recipient, associated with said food ingredients.

SUMMARY

An embodiment may have a food processing system having a recipient for processing food ingredients and at least one weighing arrangement adapted for weighing the food ingredients inside said recipient, and further having a casing adapted to support said recipient and confining said weighing arrangement, a heating arrangement adapted to provide heating to said recipient, and a driving arrangement adapted to provide driving actuation to a tool support provided so as to drive a tool disposed inside said recipient, characterized in that said weighing arrangement presents an elongated form extending in a first direction along at least most of an extension of said casing, and has a structural member and at least one weighing member provided as a single piece, whereby said structural member extends along said first direction thereby defining the overall volume of said weighing arrangement, and whereby said weighing member is provided as a cutout within the total extension of said structural member.

The author has tested different weighing arrangements and configurations in food processing machines comprising a casing supporting a recipient, whereby it has been established that the inventive weighing arrangement provides greater construction simplicity together with higher weight measuring precision, in particular in the case of relatively small weights, and rapid weight measuring responsiveness, as known solutions.

In particular, the objective of the present invention is solved by means of a food processing system presenting at least one weighing arrangement that presents an elongated form extending in a first direction that is perpendicular to the direction of the force of gravity and along at least most of an extension of the casing, advantageously an internal cross extension of said casing, and that comprises a structural member and at least one weighing member, said structural member and said at least one weighing member being provided as a single piece, whereby said structural member extends along said first direction thereby defining the overall volume of said weighing arrangement, and whereby said at least one weighing member is provided as a cutout within the total extension of said structural member.

According to an embodiment, the total extension of said at least one weighing member is of at least 10%, advantageously at least 20%, and at most 70%, advantageously at most 50% of the total extension of said structural member along said first direction.

This advantageously provides for an enhancement of weight measuring precision and responsiveness.

Moreover, said weighing arrangement may be disposed within the vertical projection of said casing and arranged below a top surface thereof, advantageously confined by said casing and at least partially inside thereof.

According to another embodiment, said structural member provides direct support at least to said actuation arrangement, advantageously also to said recipient, more advantageously to all components of said food processing system arranged above thereof.

Moreover, according to a further embodiment, said weighing arrangement is directly attached to said recipient or to said driving arrangement and/or to at least two bearing feet of said food processing system. This advantageously provides for an enhancement of weight measuring precision and responsiveness, as well as enhanced construction simplicity.

In particular, said structural member presents engagement support means, such as screwed holes, disposed at the opposing edges along said first direction and advantageously also in the center region thereof, adapted for providing support to engagement means, such as for example screws, adapted to attach said weighing arrangement to respective bearing feet and/or to said driving arrangement, respectively.

BRIEF DESCRIPTION OF THE DRAWINGS

Embodiments of the present invention shall now be explained in greater detail based upon the attached Figures. The Figures show, in schematic representations.

DETAILED DESCRIPTION OF THE INVENTION

Figure 1:
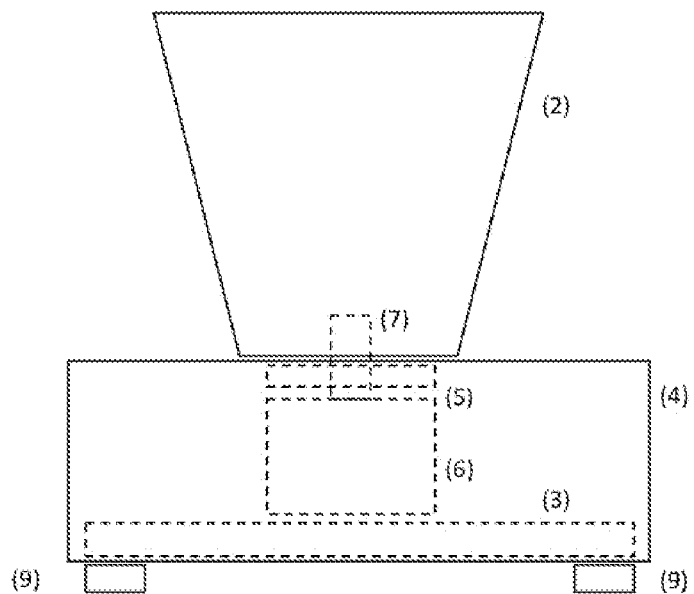
FIG. 1: a side view of a food processing system (1) according to the present invention, and comprising a weighing arrangement (3)

FIG. 1 shows a food processing system (1) according to the present invention. Said food processing system (1) comprises a recipient (2) adapted for collecting food ingredients. Moreover, said food processing system (1) comprises at least one weighing arrangement (3) adapted for weighing the food ingredients inside said recipient (2), and a casing (4) adapted to support said recipient (2) and confining said weighing arrangement (3), a heating arrangement (5) adapted to provide heating to said recipient (2), and a driving arrangement (6) adapted to provide driving actuation to a tool support (7) provided so as to drive a tool (8) disposed inside said recipient (2).

This type of food processing systems is generally known in conventional technology and some provide a scale adapted to measure weight variations associated with food ingredients being provided to said recipient (2). Notwithstanding, there are different technologies, configuration of devices and arrangements of said devices within the overall food processing system.

In particular, in the case of the food processing system (1) according to the present invention and represented in FIG. 1, there is provided at least one weighing arrangement (3) presenting an elongated form extending along at least most of an extension of said casing (4) and advantageously presenting an integrated design of structural support and weighing device, as it shall be described hereinafter in greater detail.

According to an embodiment, said at least one weighing arrangement (3) is provided so as to measure weight variations inside of said recipient (2) and to communicate said weight variations in the form of an electrical signal via wire or wirelessly, to a control device adapted to control operations of said food processing system (1) and to a display device adapted to display data to users of said food processing system (1).

Figure 2:
FIG. 2: a side view of a first embodiment of a weighing arrangement (3) comprised in a food processing system (1) according to the present invention.

FIG. 2 is a diagram of principle of a weighing arrangement (3) comprised in a food processing system (1) according to the invention, whereby it is generally supported by two respective support means—schematically represented in the drawing as upward oriented triangles—and supports a load acting thereupon along the direction of the gravity force ($F_G$).

As represented, said weighing arrangement (3), extending in a first direction along at least most of an extension of said casing (4), comprises a structural member (31) and at least one weighing member (32) provided as a single piece. This significantly reduces construction complexity and enhances measuring responsiveness.

Moreover, said structural member (31) extends along said first direction thereby defining the overall volume of said weighing arrangement (3), and whereby said weighing member (32) is provided as a cutout within the total extension of said structural member (31).

According to an embodiment, said structural member (31) and said weighing member (32) both present an elongated form along said first direction of said weighing arrangement (3), whereby the total extension of said at least one weighing member (32) is of at least 10%, advantageously at least 20%, and at most 70%, advantageously at most 50% of the total extension of said structural member (31) along said first direction.

Moreover, it is of advantage when said structural member (31) presents a total extension along said first direction that is at least similar, advantageously bigger than the characterizing maximum dimension, such as the maximum diameter, of the cross-section of said recipient (2).

These dimensional proportions advantageously provide for an enhanced weight measuring sensitivity and, hence, precision.

According to another embodiment, said weighing member (32) is disposed at least approximately centered within the total extension of said structural member (31) along said first direction. Alternatively, in the case of two weighing members (32), these are disposed symmetrically in respect of the total extension of said structural member (31) and advantageously closer to the center than to the edges of said structural member (31).

This disposition further adds to an enhanced weight measuring precision, in particular in respect of relatively small loads, such as grams or tens of grams.

As depicted, said weighing member (32) is provided as a cutout form arranged in said structural member (31) and extending through across opposing longitudinal side faces thereof.

Figure 3:
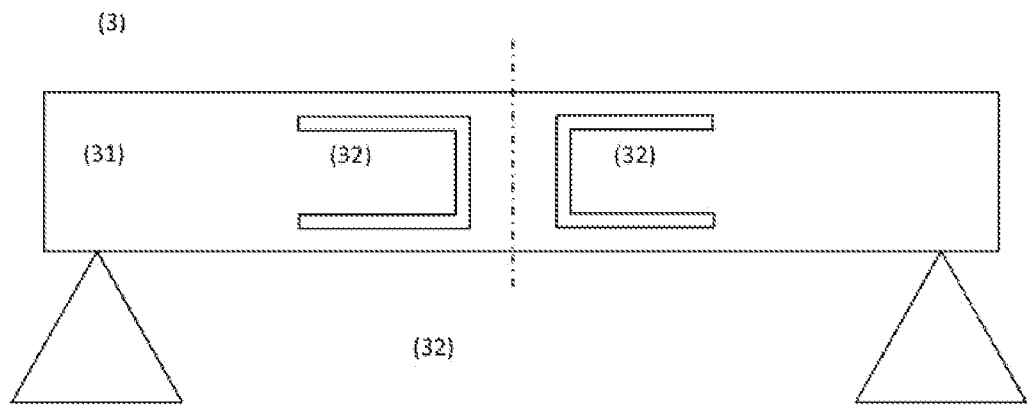
FIG. 3: a side view of a second embodiment of a weighing arrangement (3) comprised in a food processing system (1) according to the present invention.

FIG. 3 shows a second embodiment of a weighing arrangement (3) comprised in a food processing system (1) according to the invention.

As depicted, the structural member (31) in this case presents two weighing members (32) provided as a generally H-like cutout form thereof, and defining an overall symmetric distribution in respect of the extension of said structural member (31) along said first direction.

This arrangement provides for greater weight measuring precision, in particular in the case of relatively small loads, and quicker measuring responsiveness as a result of weight variations in said recipient (2).

According to an embodiment, said weighing member (32) comprises a load-detecting element, advantageously by means of measuring the deflection of said load-detecting element, adapted so that it can measure weight variations occurring in said recipient (2). This type of solution is known in conventional technology so that one abdicates from detailing it in the present document.

Figure 4:
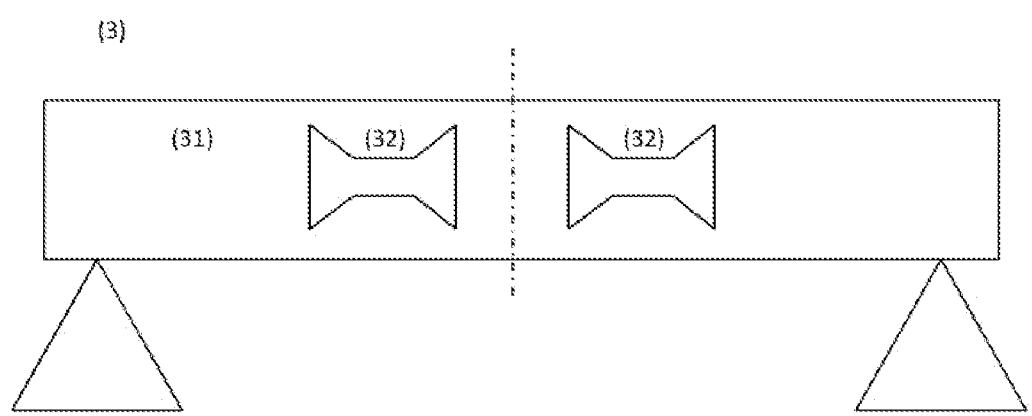
FIG. 4: a side view of a second embodiment of a weighing arrangement (3) comprised in a food processing system (1) according to the present invention.

FIG. 4 shows a third embodiment of a weighing arrangement (3) comprised in a food processing system (1) according to the invention.

Again in the case of this embodiment, the structural member (31) presents two weighing members (32), in this case provided as a generally butterfly-like cutout form thereof, including two wider areas at the edges and a narrower region in the middle.

Figure 5:
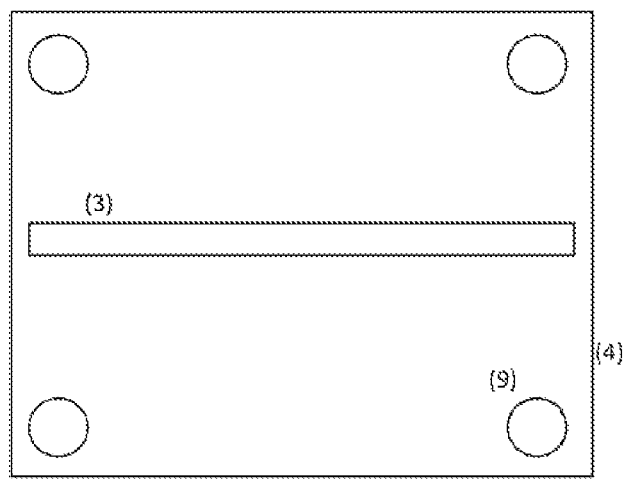
FIG. 5: a bottom view of a first embodiment of a food processing system (1) according to the present invention.

FIG. 5 represents bottom view of a first embodiment of a food processing system (1) according to the present invention, schematically depicting in particular the general disposition of a weighing arrangement (3).

In this embodiment, there is provided only one weighing arrangement (3) disposed along a substantially centered region in respect of the casing (4). In this case, the weighing arrangement (3) is supported by edge regions of said casing (4) and the latter is supported by a plurality of feet (9)—in this example, four feet (9).

In such an embodiment, it is of advantage to use a weighing arrangement (3) comprising two weighing members (32).

According to an embodiment, said structural member (31) presents engagement support means (not represented in the drawing), such as screwed holes, disposed at the opposing edges along said first direction, adapted for providing support to engagement means, such as screws, of said weighing arrangement (3) to respective feet (9) of said casing (4).

Moreover, according to another embodiment, said structural member (31) provides direct support at least to said tool support (7) and to said recipient (2), advantageously to all components of said food processing system (1) arranged above thereof.

According to yet another embodiment, said structural member (31) and said weighing member (32) are disposed in said food processing system (1) along a first direction perpendicular to the gravity force direction.

Figure 6:
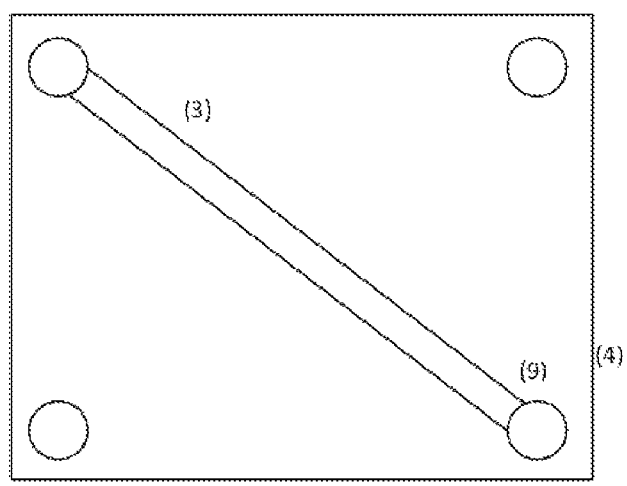
FIG. 6: a bottom view of a second embodiment of a food processing system (1) according to the present invention.

FIG. 6 represents a second embodiment of a food processing system (1) according to the invention, further comprising only one weighing arrangement (3), whereby in this case said weighing arrangement is disposed along a diagonal direction of a rectangular casing (4).

Figure 7:
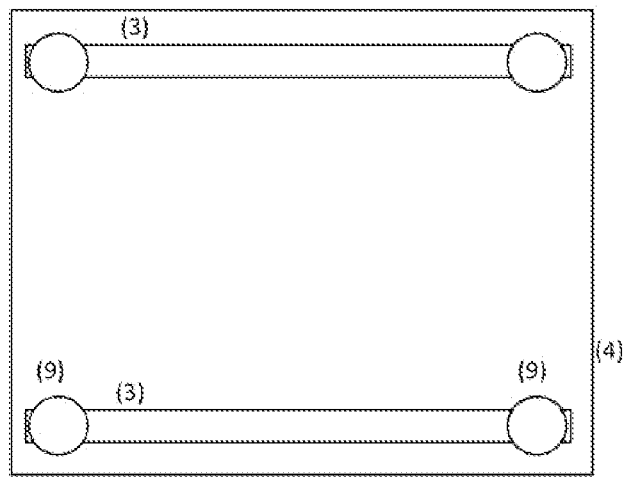
FIG. 7: a bottom view of a third embodiment of a food processing system (1) according to the present invention.

FIG. 7 represents a third embodiment of a food processing system (1) according to the present invention. In this case, there are provided two weighing arrangements (3) disposed along opposing side and in the relative proximity of the edge region of a respective casing (4).

Moreover, in this case, and according to an embodiment, that structural member (31) is directly attached to at least one bearing foot (9), advantageously to two bearing feet (9).

Figure 8:
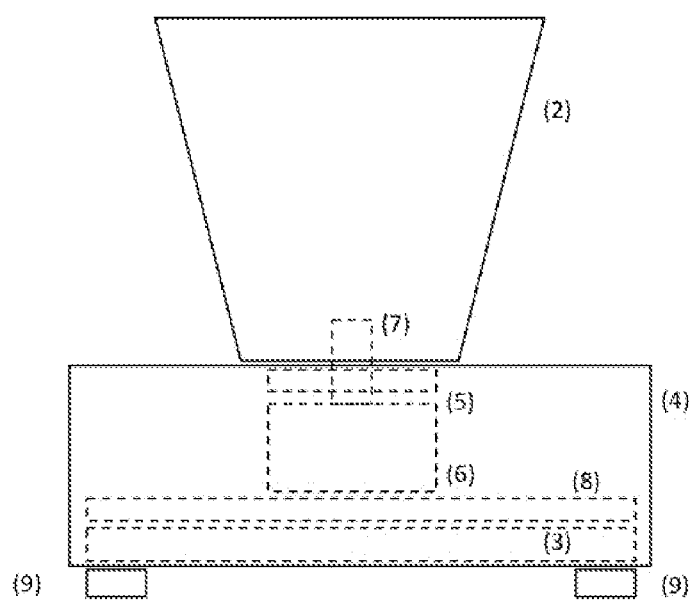
FIG. 8: a food processing system (1) according to the present invention, whereby there are provided two weighing arrangements (3) arranged according to the embodiment represented in FIG. 7.

FIG. 8 represents a food processing system (1) according to the present invention, whereby there are provided two weighing arrangements (3) arranged according to the embodiment represented in FIG. 7.

Moreover, the structural member (31) of both said weighing arrangements (3) present engagement support means (not represented in detail), such as screwed holes, disposed in the central region thereof and advantageously also in the region of opposing edges along said first direction, adapted for providing support to engagement means (not represented in detail), such as screws, adapted for directly attaching said weighing arrangement (3) to a support element (8) directly supporting said driving arrangement (6), and advantageously also directly to two respective bearing feet (9).

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A food processing system comprising:
   a recipient that processes food ingredients, and
   at least one weighing arrangement that weighs the food ingredients inside the recipient,
   a casing adapted to support the recipient and confining the weighing arrangement,
   a heating arrangement adapted to provide heat to the recipient, and
   a driving arrangement adapted to provide a driving actuation to a tool support, wherein
   the weighing arrangement includes an elongated form extending in a first direction along at least most of an extension of the casing,
   the weighing arrangement includes a structural member and at least one weighing member provided as a single piece,
   the structural member extends along the first direction to define an overall volume of the weighing arrangement, and the weighing member is provided as a cutout within a total extension of the structural member.

2. The food processing system according to claim 1, wherein the structural member and the weighing member both include an elongated form along the first direction of the weighing arrangement, wherein a total extension of the at least one weighing member is at least 10%, at least 20%, at most 50%, and at most 70%, of the total extension of the structural member along the first direction.

3. The food processing system according to claim 1, wherein the total extension of the structural member along the first direction is equal to or bigger than a characterizing maximum dimension of a cross-section of the recipient.

4. The food processing system according to claim 1, wherein the weighing member is disposed at least approximately centered within the total extension of the structural member along the first direction, or the weighing member and a second weighing member are disposed symmetrically in respect of the total extension of the structural member and closer to the center than to edges of the structural member.

5. The food processing system according to claim 1, wherein the weighing member is provided as a cutout form arranged in the structural member extending across opposing longitudinal side faces thereof.

6. The food processing system according to claim 1, wherein the weighing member is provided as a single cutout in an elongated open form or in an elongated closed form, or in a double cutout form.

7. The food processing system according to claim 1, wherein the weighing member includes a load-detecting element, and a detector that measures a deflection of the load-detecting element to determine weight variations occurring in the recipient.

8. The food processing system according to claim 1, wherein the structural member of the weighing arrangement provides direct support at least to the driving arrangement or to a support element thereof, in a rigid structural arrangement with all components of the food processing system arranged above thereof.

9. The food processing system according to claim 1, wherein the weighing arrangement is directly attached to the driving arrangement or to a support element thereof.

10. The food processing system according to claim 1, wherein the weighing arrangement is directly attached to at least two bearing elements of the food processing system.

11. The food processing system according to claim 1, wherein the structural member includes engagement support elements disposed in a central region thereof and also in a region of opposing edges along the first direction, that provide support to the engagement elements that directly attach the weighing arrangement to the driving arrangement or to a direct support element thereof, and also to two respective bearing feet.

12. The food processing system according to claim 1, wherein the recipient is structurally supported by the weighing arrangement disposed at a lower level relative to the recipient and also relative to the driving arrangement.

13. The food processing system according to claim 1, wherein the weighing arrangement extends along a generally centered extension or along a diagonal extension in respect of the casing.

14. The food processing system according to claim 1, wherein the recipient is structurally supported by two of the weighing arrangements disposed at an angle or in parallel along two mutually opposing edge regions in respect of the casing.

15. The food processing system according to claims 1, wherein the at least one weighing arrangement is provided so as to measure weight variations inside of the recipient and to communicate the weight variations by an electrical signal via wire or wirelessly, to a control device adapted to control operations of the food processing system and to a display device adapted to display data to users of the food processing system.

* * * * *